United States Patent
Dietz et al.

[15] 3,640,744
[45] Feb. 8, 1972

[54] TITANIUM DIOXIDE OF IMPROVED CHALK RESISTANCE

[72] Inventors: Albert Dietz, New Martinsville, W. Va.; Neil C. Goodspeed; Russell R. May, Jr., both of Wadsworth, Ohio

[73] Assignee: PPG Industries, Inc., Pittsburgh, Pa.

[22] Filed: Feb. 28, 1969

[21] Appl. No.: 803,448

[52] U.S. Cl. .................................... 106/300, 106/308 B
[51] Int. Cl. ............................................. C09c 3/02
[58] Field of Search ..................... 106/300, 308 I, 308 B

[56] References Cited

UNITED STATES PATENTS

| | | |
|---|---|---|
| 2,559,638 | 7/1951 | Krchma et al. ................. 106/300 |
| 2,689,781 | 9/1954 | Schaumann ................. 106/300 X |
| 3,146,119 | 8/1964 | Ritter ................. 106/300 |
| 3,468,689 | 9/1969 | Lott et al. ................. 106/300 |

Primary Examiner—James E. Poer
Assistant Examiner—H. M. S. Sneed
Attorney—Chisholm and Spencer

[57] ABSTRACT

Pigmentary titanium dioxide, especially titanium dioxide containing coreacted aluminum and silicon, is heat treated and then given a hydrous metal oxide coating, e.g., an alumina and silica coating. The resulting pigment has good chalk resistance and good retention of optical properties, such as gloss, color and tint efficiency.

7 Claims, No Drawings

TITANIUM DIOXIDE OF IMPROVED CHALK RESISTANCE

BACKGROUND OF THE INVENTION

Paint and lacquer films that are pigmented with regular (unmodified) titanium dioxide alone usually exhibit a type of failure known as "chalking" in outdoor service, i.e., the film surface tends to disintegrate to a powdery chalk. This type of failure takes place continuously at the surface of the film and eventually results in total destruction of the film. Such failure is caused, in part, by the pigment which, consequently, is said to possess poor chalk resistance.

Although many theories have been suggested to explain this type of disintegration, the exact mechanism by which such failure occurs is not known for certain. Since this type of disintegration occurs only on outdoor exposure of the film, the theory advanced most often for the poor weatherability of films pigmented with titanium dioxide is the action of sunlight on the pigment.

There have been methods proposed for producing titanium dioxide pigments that are resistant to outdoor weathering. One such method is to incorporate small amounts of conditioning agents such as antimony trioxide, zinc oxide and rare earth compounds with the titanium oxide hydrolysate before calcination. Another proposed method is to coat the individual particles of titanium dioxide after calcination with small amounts of one or more hydrous oxides of such metals as aluminum, chromium, silicon, titanium, tin, thorium, cerium, zinc and zirconium. Such treatments often increase the pigment's resistance to chalking, discoloration and fading to an appreciable extent but in some cases at sacrificing pigment color, brightness, tint efficiency and tinting strength.

Although the above-suggested methods result in some improvement in the outdoor weathering properties of titanium dioxide, there is a need for further improvement.

SUMMARY OF THE INVENTION

It has now been discovered that titanium dioxide having improved outdoor weathering properties, e.g., chalk resistance and gloss retention, can be produced by a combination of physical and chemical treatments. More particularly, such treatments comprise mildly heating pigmentary titanium dioxide prepared by vapor phase oxidation of titanium halide at temperatures of from about 500° to about 750° C., and thereafter the thus heated titanium dioxide with at least one hydrous metal oxide selected from the hydrous metal oxides of aluminum, silicon, zirconium and titanium.

DETAILED DESCRIPTION

Titanium dioxide pigment is produced commercially by at least two different manufacturing processes. One such process is known as the "sulfate or acid" process. In the sulfate process, a titaniferous ore, such as ilmenite, is digested with sulfuric acid to form a digest cake. The cake is dissolved in an aqueous medium to form a sulfate solution which, after clarification and concentration, is hydrolyzed to precipitate an insoluble titanium oxide hydrolysate. The hydrolysate is filtered, washed and calcined at temperatures ranging between 800° and 1,200° C. or higher to develop the pigmentary properties of the pigment. Such pigment is often referred to as "sulfate pigment" or "calcined titanium dioxide." The calcination can be conducted with or without additives, such as compounds of zinc. The additives are utilized to reduce the effective calcination temperature and to promote the development of the rutile crystalline form. See, for example, U.S. Pat. Nos. 2,253,551, 3,062,673 and 3,330,798.

Another and more recent process developed for preparing pigmentary titanium dioxide is that of the vapor phase oxidation of a titanium halide, such as titanium tetrahalide. Typically, this method involves reacting vaporous titanium halide, e.g., titanium trichloride or titanium tetrachloride, with oxygen in a reaction zone at temperatures between about 800° and about 1,200° C. Pigment prepared by the aforementioned process is often referred to as "chloride process pigment." The aforementioned vapor phase oxidation process is suitably described in U.S. Pat. Nos. 3,068,113 and 3,214,284, which are incorporated herein, in toto, by reference.

In the "chloride process," metal and nonmetal compounds, such as aluminum compounds, zirconium compounds, silicon compounds and alkali metal and/or alkaline earth metal compounds are often added to the vapor phase reaction zone. The presence and coreaction of such compounds aids in the production of titanium dioxide having excellent pigmentary properties. The particular compounds of aluminum, zirconium, silicon and the alkali and alkaline earth metals that can be used in the "chloride process," as well as their respective amounts, are well known in the art. Reference is made to U.S. Pat. No. 3,214,284, which has been incorporated herein, as an example of the state of the art.

The method of the present invention is especially applicable to raw pigmentary titanium dioxide prepared by vapor phase oxidation of titanium halide, such as the tetrachloride, tetrabromide and tetraiodide, in the presence of aluminum and silicon compounds in quantities sufficient to provide from about 1 to about 2.5 weight percent, preferably from about 1.5 to about 2.0 weight percent coreacted alumina, and from about 0.1 to about 1.0 weight percent, preferably from about 0.3 to about 0.75 weight percent coreacted silica. The aforementioned quantities of coburned or cooxidized alumina and silica are calculated as $Al_2O_3$ and $SiO_2$, respectively based on the quantity of $TiO_2$ produced.

The term "raw pigmentary titanium dioxide" is intended to mean and include pigmentary titanium dioxide, especially rutile titanium dioxide, that has had its basic pigmentary properties developed. Also included within said term are pigments that have been physically treated, for example, by milling, grinding, hydroseparation, filtration, and degassing procedures. "Raw pigmentary titanium dioxide" is to be distinguished from a "finished" titanium dioxide pigment which is defined herein as a raw pigment which has been given one or more inorganic and/or organic coatings. Thus, a raw pigment is one which has had the basic chemical composition of its surface substantially unaltered once the basic pigmentary properties have been developed; whereas, a "finished" pigment is a pigment which has had the chemical composition of its surface altered by the addition of a chemical coating to the surface of the pigment. An example of one such coating technique is found in U.S. Pat. No. 3,146,119.

In accordance with the present invention, raw pigmentary titanium dioxide is mildly heated at temperatures of from about 500° to about 750° C., more preferably from 550° to about 700° C. and, thereafter, the resulting pigment is coated with at least one hydrous metal oxide of metals selected from the group consisting of aluminum, silicon, zirconium and titanium. Most preferably, the pigment is heated at temperatures of from about 6600° to about 650° C. The use of temperatures below about 500° C. results in a pigment of poor photolytic stability. The use of temperatures greater than 750° C. results in degradation of the color of the pigment and poor photolytic stability.

The above-recited range of 500° to 750° C. is to be distinguished from temperatures at which titanium dioxide pigment is dried and temperatures at which the pigment is calcined. Typical temperatures at which titanium dioxide is dried to avoid degradation of the pigment range from about 60° to about 300° C., usually range between 100° and 220° C. Calcination temperatures typically range from about 800° to about 1,200° C., and most commonly range from about 900° to about 1,000° C.

The pigment is heated at the temperatures recited hereinabove for a time sufficient to improve the resulting photolytic stability of the pigment and the pigment's durability, i.e., resistance to outdoor weathering. Generally, the higher the heating temperature, the shorter the heating time required to obtain improved photolytic stability and vice versa. Contemplated are heating periods of from about 10 minutes to about 5 hours at temperatures of from 750° to about 500° C. respectively. Typically, heating is conducted for from about 10 minutes to about 120 minutes, preferably from about 20 to about 30 minutes at temperatures of from about 600° to 650° C. Times of less than 10 minutes are usually inadequate to assure that all of the pigment is heat treated, whereas heating periods of greater than 120 minutes, e.g., 5 hours, have not resulted in any apparent improvements in photolytic stability over shorter heating periods at such temperatures. Thus, while extended heating periods of greater than 120 minutes at temperatures less than 650° C. can be used, such heating times should be avoided at temperatures of greater than about 700° C. in order to avoid degradation of the pigment's properties.

Following heat treatment, it has been found expedient to mill the heat treated pigment, e.g., by fluid energy milling, to break up any pigment agglomeration that has resulted from the heat treatment and to obtain optimum dispersion in the aqueous slurry prepared with the heat treated pigment.

The heat-treated pigment is then coated with at least one hydrous metal oxide of metals selected from the group consisting of aluminum, silicon, zirconium and titanium. Particularly contemplated are coatings of hydrous alumina alone, hydrous silica alone, hydrous zirconia and silica, hydrous silica and alumina, and hydrous alumina, silica and titania. A combined coating of hydrous silica and alumina is preferred. Following application of the hydrous metal oxide to the pigment, the pigment is filtered, washed, dried and fluid energy milled. The procedure for the above-mentioned coating technique is art-recognized and is adequately described in publications and issued U.S. patents. Reference is made to U.S. Pat. No. 3,146,119 and copending U.S. application, Ser. No. 691,931, U.S. Pat. No. 3510,334, which are incorporated herein, in toto, by reference to illustrate the aforementioned coating technique. Only so much of said technique as is necessary for the understanding of the present method without reference to the aforementioned patent and patent application, therefore, will be incorporated herein. Other details can be found by reference to the aforementioned patent and patent application.

Typically, the coating procedure is performed in an aqueous medium at temperatures of between about 30° and about 100° C. and comprises adding hydrolyzable compound of silicon, aluminum, zirconium and titanium that yield silica, alumina, zirconia, and titania hydrates, respectively, upon hydrolysis to an aqueous slurry of the titanium dioxide pigment. The aqueous slurry typically comprises between about 10 and about 30 weight percent titanium dioxide and usually comprises about 20 weight percent titanium dioxide.

The water in which the pigment is slurried should be such so as not to incorporate harmful contaminants into the pigment, i.e., the water should be relatively pure, e.g., deionized or distilled water.

The hydrolyzable metal salts of aluminum, silicon, zirconium and/or titanium are added to the slurry and hydrolyzed, if necessary, by the addition of a suitable neutralizing agent, i.e., an acid or base, depending on the pH of the slurry and the conditions under which said metal salts hydrolyze completely. If the slurry pH is alkaline, the slurry pH can be adjusted with an acidic agent, such as an inorganic acid (HCl H$_2$SO$_4$, H$_3$PO$_4$, etc.) or acid yielding metal salts such as titanium tetrachloride and aluminum sulphate. If the slurry pH is acidic, the pH of the slurry can be adjusted with an alkaline agent. Any conventional alkaline agent utilized in the pigment industry can be used. Preferably the alkaline material forms a halogen salt which is soluble in the liquid medium used to wash the flocculated pigment and/or volatile under the conditions at which the pigment is dried. Typical of the alkaline agents that can be used, alone or in any combination, include sodium hydroxide, potassium hydroxide, lithium hydroxide, ammonium hydroxide, gaseous ammonia, potassium carbonate, sodium carbonate, potassium bicarbonate and sodium bicarbonate.

After the addition and hydrolysis of the desired hydrolyzable metal compound(s), the pH of the pigment slurry is further adjusted, if necessary, to a level at which the pigment, now coated with hydrous metal oxides, flocculates, i.e., between about 5 and about 8, usually about 7.

The slurry typically is maintained at a temperature of from about 30° to about 100° C., preferably 60° to 85° C., for a period ranging from about 5 minutes to about 20 hours, preferably from 1 to 3 hours, so as to digest the slurry and insure proper setting of the hydrous metal oxide on the surface of the pigment. Such digestion can be conducted after hydrolysis of the metal salts and/or after the slurry is brought into the floc-forming range. The slurry, following such digestion, should have a substantially neutral pH, i.e., from about 6.5 to about 7.5. The need for a pigment with a pH near neutral is necessitated by the commercial requirement that the finished pigment have a PH of approximately neutral so that it does not react with any oleoresinous vehicle into which it is incorporated.

Precipitation of more than one hydrous metal oxide onto the surface of the titanium dioxide pigment can be performed simultaneously or in any desired sequence. Additional layers of hydrous metal oxide can be applied to the pigment by repeating the aforementioned procedure, i.e., reslurrying of the pigment, if necessary, addition of hydrolyzable metal salts to the slurry, hydrolysis thereof, adjustment of the slurry pH and digestion.

The aqueous slurry containing the coated, flocculated pigment is then filtered, washed to remove impurities such as salts of hydrolysis, dried and ground in a mill, e.g., a fluid energy mill such as a micronizer.

Titanium compound that can be used to coat the TiO$_2$ pigment in accordance with the present process are water soluble compounds of titanium from which, upon hydrolysis, there can be precipitated titanium oxide, a titania hydrate, e.g., Ti(OH)$_4$, TiO$_2$·xH$_2$O, TiO(OH)$_2$, or a titanium hydrate condensate, e.g.,

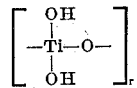

wherein $r$ is at least 2, or mixtures thereof. Examples of suitable titanium compounds include: titanium tetrachloride, titanium tetraiodide, titanium tetrabromide, titanium sulphate, titanyl sulfate, titanium esters, such as tetraethyl titanate, tetra-2-chloroethyl titanate, tetraphenoxy titanium and alkali metal titanates, e.g., lithium, sodium and potassium titanates. Likewise, tetra-acyloxy titanium, for example, tetra-acetyl titanium and tetrabutyric titanium can be employed. Titanium tetrachloride is economically preferred.

Aluminum compounds that can be used to coat the TiO$_2$ pigment in accordance with the present process are water soluble compounds of aluminum from which, upon hydrolysis, there can be precipitated al(OH)$_3$, an alumina hydrate, or an aluminum hydrate condensate, e.g.,

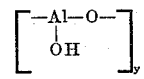

wherein $y$ is at least 2, or mixtures thereof. Aluminum condensates include low molecular weight Al$_2$O$_3$ containing hydroxyl groups. Such condensates can be characterized as a low molecular weight aluminoxy polymer having the repeating unit:

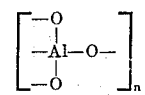

wherein $n$ generally has a value of 2 or more. The free valences of the repeating unit are attached to hydrogen, alkoxy, aryloxy, acyloxy, $Al(OH)_2$ radicals or cross-linked with other materials of the same unit formula.

Examples of suitable aluminum compounds include: aluminum chloride, aluminum bromide, aluminum sulfate, alkyl and aryl aluminum such as triethyl aluminum trihexyl aluminum and triphenyl aluminum. Likewise, alkoxy and aryloxy aluminum such as triethoxy aluminum, tributoxy aluminum and triphenoxy aluminum can be employed. Acyloxy aluminum such as triacetyl aluminum can also be used. Aluminum chloride and aluminum sulfate are preferred.

Silicon compounds that can be used to coat the $TiO_2$ pigment in accordance with the present process are water soluble compounds of silicon from which there can be precipitated a silica hydrate, e.g., $Si(OH)_4$, $SiO_2 \cdot xH_2O$, $SiOy \cdot xH_2O$, $SiO(OH)_2$, silicon oxide, a silicon hydrate condensate, e.g.,

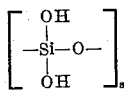

wherein $s$ has a value of at least 2 or mixtures thereof.

Examples of suitable silicon compounds include: silicic acid and alkali metal silicates, e.g., sodium and potassium silicate, $SiCl_4$, $SiBr_4$, $SiI_4$, $SiH_4$, $Si(OOCCH_3)_4$, $Si(OCH_3)_4$, $Si(NH_2)_2$, $Si(NH_2)_4$ or other such hydrolyzable silicon compounds. Preferably, the silicon compound is added to the pigment slurry in the form of an aqueous solution.

Zirconium compounds that can be used to coat the $TiO_2$ pigment in accordance with the present process are water soluble compounds of zirconium from which there can be precipitated a zirconia hydrate, e.g., $ZrO_2 \cdot xH_2O$, zirconium oxide or a zirconium hydrate condensate. Examples of suitable zirconium compounds include: ZIRCONIUM sulfate, zirconyl chloride, zirconyl bromide, zirconyl iodide, zirconium fluoride and zirconyl nitrate.

The application of the hydrous titania, alumina, zirconia and silica coatings can be chemically represented by the following unbalanced equations:

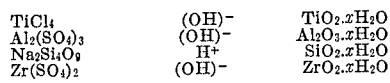

The titanium compound, preferably titanium tetrachloride, is added to the pigment slurry in an amount sufficient to coat the titanium dioxide pigment with from 0.05 to 10 percent, preferably 0.1 to 3 percent, by weight titania, calculated as $TiO_2$, based on the weight of the pigment.

The aluminum compound, preferably aluminum chloride or aluminum sulfate, is added to the pigment slurry in an amount sufficient to coat the titanium dioxide pigment with from 0.05 to 15 percent, preferably 0.5 to 5 percent, by weight alumina, calculated at $Al_2O_3$, based on the weight of the pigment.

The silicon compound, preferably silicic acid or sodium silicate, is added to the titanium dioxide pigment slurry in an amount sufficient to coat the titanium dioxide pigment with from 0.01 to 10 percent, preferably from 0.4 to 4 percent, by weight silica, calculated as $SiO_2$, based on the weight of the pigment.

The zirconium compound, preferably zirconium sulfate or zirconyl chloride, is added to the pigment slurry in an amount sufficient to coat the titanium dioxide pigment with from 0.05 to 15 percent, preferably 0.5 to 5 percent, by weight zirconia, calculated as $ZrO_2$, based on the weight of the pigment.

The above quantities of silicon, aluminum zirconium and titanium compounds added to the pigment slurry are typical of those amounts conventionally used. Quantities greater or less than those recited can be employed. Of particular utility are coatings of hydrous alumina and hydrous silica wherein from about 1 to 3 weight percent of each, based on $TiO_2$, is used. Typically, the percentage ratio of hydrous alumina to hydrous silica (weight percent based on $TiO_2$) is 1:3 to 3:1. The total amount of hydrous metal oxide coating placed on the titanium dioxide pigment typically ranges from about 2 to about 20 weight percent, preferably 3 to 15 weight percent, based on the weight of the pigment.

After filtering the pigment slurry, impurities such as salts are removed by washing of the filtered flocs with an extractant such as water, alcohols, ethers, ketones, or mixtures of same.

After washing, the pigment is dried at temperatures of from 60° to 300° C., preferably 100° to 220° C., e.g., by means of an oven, belt dryer, or spray dryer, and then milled, e.g., in a fluid energy mill.

In a typical embodiment of the present invention, titanium dioxide prepared by vapor phase oxidation of titanium tetrachloride is heated in a rotary kiln at 650° C. for about 30 minutes. The resulting pigment is fluid energy milled and then slurried in deionized water to give a slurry of about 20 weight percent solids. The pH of the resulting slurry is adjusted to between about 9 and 10 and the slurry hydroclassified in a series of Dorrclone classifiers. Sodium silicate and aluminum sulfate solutions sufficient to yield, respectively, about 1 weight percent silica and about 3 weight percent alumina, based on $TiO_2$, are added to the overflow from the Dorrclone classifier and the resulting slurry heated from ambient temperature to about 85° C. The slurry is neutralized to a pH of about 7 with anhydrous ammonia and sodium carbonate and digested for about an hour at 85° C. The alumina-silica coated $TiO_2$ pigment is recovered by filtration. The filter cake is washed with deionized water, dried at about 110° C., and fluid energy milled.

Evaluation of the pigments produced in accordance with the process described herein, such as in the succeeding examples, can be performed utilizing conventional pigment tests, as well as by outdoor exposure of paint panels prepared with such pigments.

The tinting strength and tint tones of pigments can be determined by means of A.S.T.M. Method D-322-26 which is found in the 1949 Book of A.S.T.M. Standards, published by the American Society for Testing Materials, Philadelphia 3, Pa.

The tint efficiency of a pigment, which is a measure of the ability of a white pigment to resist tinting by a colored pigment, can be determined by the reflectometry method described in A.S.T.M. Method D-2745-68T. This method was orginally described by Mitton and Jacobsen in the *Journal of Paint Technology and Engineering*, (Official Digest, Volume 34, pp. 704-715, July, 1962).

The percent gloss retained of an exposed paint panel can be measured by a Hunter Glossmeter. A procedure for this method is found in A.S.T.M. Method D-523-62T. A high gloss retention percentage is an indication of increased durability for a pigment.

Photoreactivity of the pigment can be determined by the use of the Mandelic Acid Test. This test depends on the photochemical reduction of titanium dioxide to a lower oxide with the simultaneous oxidation of a liquid medium such as aqueous solutions of stannous chloride, glycerol, aqueous solutions of mandelic acid, octyl alcohol, and mineral oil. Although glycerol produces the fastest reaction, mandelic acid is often employed because of operational advantages such as workability of the paste. This test method is described by A. E. Jacobsen in *Industrial Engineering Chemistry*, Vol. 41, p. 524, (1949).

Basically, this test comprises mulling about 10 grams of the sample pigment into a soft paste with the liquid medium such as glycerol or a 0.5 molar solution of mandelic acid in water. The paste is placed on a glass plate 5×5×0.04 inches, covered by another plate of the same size and pressed out to a surface area of 4 inches in diameter. The edges of the plate are bound with ⅜-inch cellulose adhesive tape to prevent drying of the paste. An initial reflectance is made with a tristimulus reflectometer and recorded. For exposure, the glass slide of the sample pigment and a glass slide of a similarly prepared standard pigment are placed on the outer edge of a rotating table below a source of ultraviolet light such as a sunlamp. Additional readings are made at suitable intervals of time and the rate of discoloration of the experimental pigment relative to the standard determined. As a result of these reading, the experimental pigment is given a rating, based on the standard, of from 1 to 10. In this scale, 1 is the least photoreactive and 10 the most photoreactive. A pigment yielding a rating of from 1 to 3 is usually considered to have good resistance to photoreactivity.

Titanium dioxide is a well-known commercial white pigment and is used in the paint, coatings and paper industry.

The present process is more particularly described in the following examples which are intended as illustrative only since numerous modifications and variations therein will be apparent to those skilled in the art.

hydrous oxide coating described in preparation A.

Each of the aforementioned prepared pigments (preparations A and B) was tested for (1) photoreactivity by the mandelic acid test, and (2) tint efficiency. Portions of the aforesaid pigments, as well as three commercially available titanium dioxide pigments, were each incorporated into both a thermoset acrylic vehicle and a melamine alkyd vehicle.

Paint panels prepared with the thermoset acrylic vehicle composition were exposed at 5° horizontal, Florida south for 18 months and the 20° and 60° gloss retained measured by a Hunter Glossmeter at 12 and 18 months. Paint panels from the melamine alkyd vehicle were exposed at 5° horizontal, Medina (Ohio) south for 24 months and the 20° gloss retained measured by a Hunter Glossmeter. The results of the above tests are tabulated in Table I.

TABLE I

| Pigment preparation | Photo-reactivity Mandelic acid test | Tint efficiency | Thermoset acrylic vehicle Florida exposure (series 061) Gloss readings | | | | Melamine-alkyd vehicle Ohio exposure (series 062) Gloss readings |
|---|---|---|---|---|---|---|---|
| | | | 20° | | 60° | | 20° |
| | | | 12 mos. | 18 mos. | 12 mos. | 18 mos. | 24 months |
| A | 3 | 101 | 31 | 4 | 60 | 13 | 29 |
| B | 2 | 97 | 45 | 11 | 74 | 36 | 30 |
| Commercial pigment X ᵃ | | *92.5 | 19 | 1 | 49 | 11 | 46 |
| Commercial pigment Y ᵇ | | *87.5 | 17 | 2 | 55 | 21 | 34 |
| Commercial pigment Z ᶜ | | *87.5 | 22 | 2 | 58 | 22 | 34 |

ᵃ Automotive enamel grade pigment.
ᵇ Durable grade sulfate process TiO₂ pigment.
ᶜ Durable grade sulfate process TiO₂ pigment from a source different than (b).
*Average value for samples of the pigment.

The data of Table I show that paint panels prepared with pigment processed in accordance with the present invention (preparation B) have a definite advantage in 20° and 60° gloss retention and tint efficiency for the vehicle systems tested when compared with two commercial durable grade sulfate process TiO₂ pigments.

EXAMPLE I

Titanium dioxide prepared by vapor phase oxidation of titanium tetrachloride in the presence of titanium tetrachloride in the presence of aluminum chloride and silicon tetrachloride was processed further in accordance with the procedures set forth hereinafter. The base pigment had a tinting strength value of about 1640, a tone of Brown −1, an oil absorption of about 19, and contained about 1.7 weight percent coreacted alumina, and about 0.3 weight percent coreacted silica, based on TiO₂.

PREPARATION A

To an aqueous slurry of the base pigment (about 20 weight percent solids) at ambient temperatures (about 25° C.) was added sufficient sodium silicate and aluminum sulfate to yield about 1.0 weight percent hydrous silica (calculated as SiO₂) and about 3.2 weight percent hydrous alumina (calculated as Al₂O₃) respectively, based on TiO₂. The resulting slurry was heated to about 85° C. and digested at that temperature for about 1 hour. Thereafter, the slurry was neutralized with anhydrous ammonia to a neutral pH and the slurry digested to insure proper setting of the hydrous silica and alumina coating. The coated pigment was recovered by filtration, washed with deionized water, dried at a temperature of about 110° C. and fluid energy milled in a Trost mill.

PREPARATION B

Base pigment was heat treated for about 1 hour at about 600° C. in a muffle furnace. The heat treated pigment was fluid energy milled in a Trost mill and then given the same hydrous oxide coating described in preparation A.

EXAMPLE II

Titanium dioxide prepared by vapor phase oxidation of titanium tetrachloride in the presence of aluminum chloride and silicon tetrachloride was processed further in accordance with the procedures set forth hereinafter. The base pigment had a tinting strength value of about 1680, a tone of Neutral, an oil absorption of about 18 and contained about 1.7 weight percent coreacted alumina and about 0.3 weight percent coreacted silica, both based on TiO₂.

PREPARATION A

To an aqueous slurry of the base pigment (about 20 weight percent solids) at ambient temperatures (about 25° C.) was added sufficient sodium silicate and aluminum sulfate to yield about 1.0 weight percent hydrous silica (calculated as SiO₂) and about 3.2 weight percent hydrous alumina (calculated as Al₂O₃) respectively, based on TiO₂. The resulting slurry was heated to about 85° C. and digested at that temperature for about 1 hour. Thereafter, the slurry was neutralized with anhydrous ammonia to a neutral pH and the slurry digested to insure proper setting of the hydrous silica and alumina coating. The coated pigment was recovered by filtration, washed with deionized water, dried at a temperature of about 110° C. and fluid energy milled in a Trost mill.

PREPARATION B

Base pigment was heat treated for about 1 hour at about 600° C. in a muffle furnace. The heat-treated pigment was fluid energy milled in a Trost mill and then given the same hydrous oxide coating described in preparation A.

Each of the aforementioned prepared pigments (preparations A and B) was tested for (1) photoreactivity by the mandelic acid test and (2) tint efficiency. Portions of the aforesaid pigments, as well as the three commercial titanium dioxide pigments recited in Example I and Table I, were each incorporated into a thermoplastic acrylic vehicle and an air-DRY alkyd vehicle. Paint panels prepared with the thermoplastic acrylic vehicle were exposed at 5° horizontal, Medina (Ohio) south for 15 months and the 60° gloss retained measured by a Hunter Glossmeter. Paint panels prepared from the air-dry alkyd vehicle were exposed at 5° horizontal, Florida south and the 60° gloss retained after 18 months' exposure measured. The results of the above tests are tabulated in Table II.

The results of Table III show that a paint panel prepared with pigment processed in accordance with the present invention (preparation A) is equal or better in 60° gloss retention in the vehicle system tested than two commercial durable grade chloride process TiO$_2$ pigments.

While there are above described a number of specific embodiments of the present invention, it is obviously possible to produce other embodiments and various equivalent modifications thereof without departing from the spirit of the invention.

TABLE II

| Pigment preparation | Photo-reactivity Mandelic acid test | Tint efficiency | Air-dry alkyd Florida exposure (series 091) 60° gloss readings 18 months | Thermoplastic acrylic Ohio exposure (series 114) 60° gloss readings 15 months |
|---|---|---|---|---|
| A | 2 | 96 | 31 | 11 |
| B | 2 | 93 | 42 | 28 |
| Commercial pigment X(a) | | *92.5 | 25 | 43 |
| Commercial pigment Y(b) | | *87.5 | 20 | 33 |
| Commercial pigment Z(c) | | *87.5 | 19 | 25 | a Automotive enamel grade pigment.
b Durable grade sulfate process TiO$_2$ pigment.
c Durable grade sulfate process TiO$_2$ pigment from a source different than (b).
*Average value for samples of the pigment.

The data of Table II show that the paint panel prepared with pigment processed in accordance with the present invention (preparation B) has a definite advantage to the two durable grade pigments shown in tint efficiency and in 60° gloss retention in an air-dry alkyd vehicle.

EXAMPLE III

Titanium dioxide prepared by vapor phase oxidation of titanium tetrachloride in the presence of aluminum and silicon was processed further in accordance with the procedure set forth hereinafter. The base pigment's optical properties and coreacted silica and alumina content were comparable to those recited for the base pigments of Examples I and II.

PREPARATION A

Base pigment was heat treated for about 1 hour at about 600° C. in a muffle furnace. The heat treated pigment was fluid energy milled in a Trost mill and then given a hydrous alumina-hydrous silica coating in the same manner as described in preparation A of Example I.

A portion of the pigment prepared in accordance with Preparation A, and portions of three commercially available titanium dioxide pigments, were each incorporated into an air-dry alkyd vehicle. Paint panels prepared with the air-dry alkyd vehicle compositions were exposed at 5° horizontal, Florida south. The 60° gloss retained by these panels after 8 months' exposure was read by a Hunter Glossmeter. The results of the readings are tabulated in Table III.

TABLE III

Air-dry Alkyd Vehicle
Florida Exposure
(Series 142)
60° Gloss Readings

| Pigment Preparation | 8 months |
|---|---|
| A | 36 |
| Commercial Pigment U(a) | 36 |
| Commercial Pigment V(b) | 22 |
| Commercial Pigment W(c) | 18 |

(a) durable grade chloride process TiO$_2$ (b) durable grade chloride process TiO$_2$ from a source other than (a)

(c) gloss enamel TiO$_2$ pigment

Having set forth the general nature and specific embodiments of the present invention, what is claimed is particularly pointed out in the appended claims.

1. In the method of treating raw pigmentary titanium dioxide containing from about 1 to about 2.5 weight percent cooxidized alumina and from about 0.3 to about 0.75 weight percent cooxidized silica by coating said pigment with at least one member selected from the group consisting of the hydrous metal oxides of aluminum, silicon, zirconium and titanium, the improvement which comprises increasing the photolytic stability of said pigment by heating the raw pigment at from about 500° to about 750° C. for from about 5 hours to ten minutes, respectively, before coating said pigment with said hydrous metal oxide.

2. In the method of treating raw pigmentary titanium dioxide containing from about 1 to about 2.5 weight percent cooxidized alumina and from about 0.3 to about 0.75 weight percent cooxidized silica by coating said pigment with hydrous alumina and hydrous silica, the improvement which comprises increasing the photolytic stability of said pigment by heating said raw pigment at from about 600° to about 650° C. for from about 20 to about 30 minutes before coating said pigment with said hydrous metal oxide.

3. A method according to claim 2 wherein the total amount of hydrous metal oxide coating ranges from about 2 to about 20 weight percent, based on titanium dioxide.

4. A method according to claim 1 wherein said raw pigment is heated at from about 600° to about 650° C. for from about 20 to about 30 minutes.

5. A method according to claim 1 wherein the total amount of hydrous metal oxide coating ranges from about 2 to about 20 weight percent, based on titanium dioxide.

6. Pigmentary titanium dioxide prepared by the method of claim 1.

7. Pigmentary titanium dioxide prepared by the method of claim 2.

* * * * *